United States Patent [19]

Kinoshita

[11] Patent Number: 4,651,705
[45] Date of Patent: Mar. 24, 1987

[54] IGNITION SYSTEM FOR AN INTERNAL COMBUSTION ENGINE

[75] Inventor: Atsufumi Kinoshita, Shizuoka, Japan

[73] Assignee: Kokusan Denki Co., Ltd., Numazu, Japan

[21] Appl. No.: 861,435

[22] Filed: May 9, 1986

[30] Foreign Application Priority Data

May 10, 1985 [JP] Japan .............................. 60-69056[U]

[51] Int. Cl.$^4$ .......................................... F02P 5/04
[52] U.S. Cl. .................................... 123/603; 123/602
[58] Field of Search ............................... 123/603, 602

[56] References Cited

U.S. PATENT DOCUMENTS

| 3,739,759 | 6/1973 | Sleder | 123/603 |
| 3,911,889 | 10/1975 | Nagasawa | 123/603 |
| 4,566,425 | 1/1986 | Nitou | 123/603 |

Primary Examiner—Ronald B. Cox
Attorney, Agent, or Firm—Pearne, Gordon, McCoy & Granger

[57] ABSTRACT

In an ignition system for an internal combustion engine, positive half cycles of an output of the exciter coil are used as the ignition energy. A signal coil outputs a maximum advance angle side signal whose magnitude exceeds a threshold at the maximum advance angle position and a minimum advance angle side signal whose magnitude exceeds a threshold at the minimum advance angle position. An ignition timing control circuit is responsive to a maximum advance angle position indicating pulse derived from the maximum advance angle side signal and a minimum advance angle position indicating pulse derived from the minimum advance angle side signal for producing an ignition signal. The exciter coil and the signal coil have such a phase relation that the minimum advance angle side signals are produced during the negative half cycles of the exciter coil when the engine is rotating forward, and are produced during the positive half cycles of the when the engine is rotating backward. A bypassing switch bypasses the minimum advance angle position indicating pulse away from the ignition timing control circuit during the positive half cycles, so as to prevent production of the ignition signal when the engine is rotating backward.

7 Claims, 9 Drawing Figures

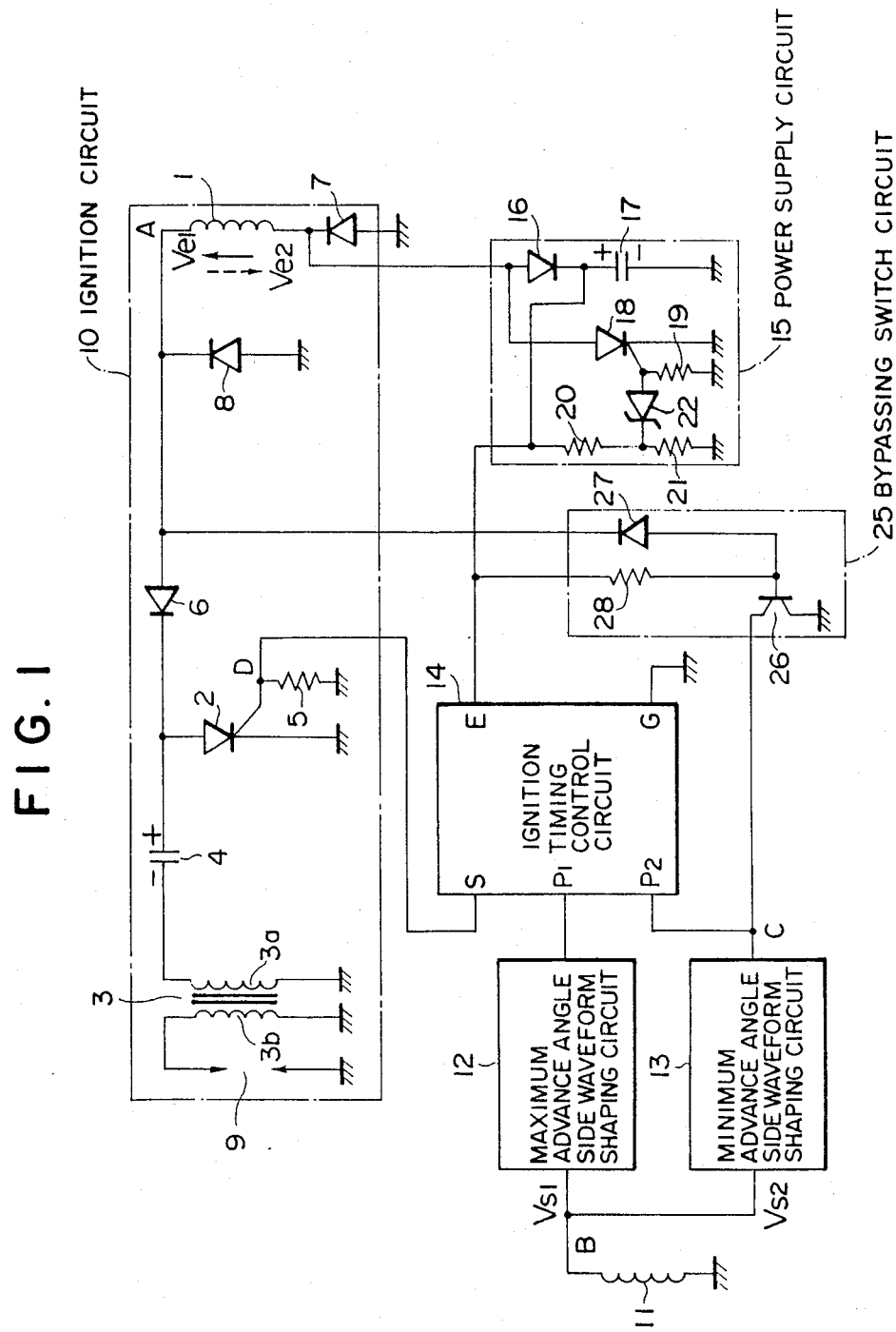

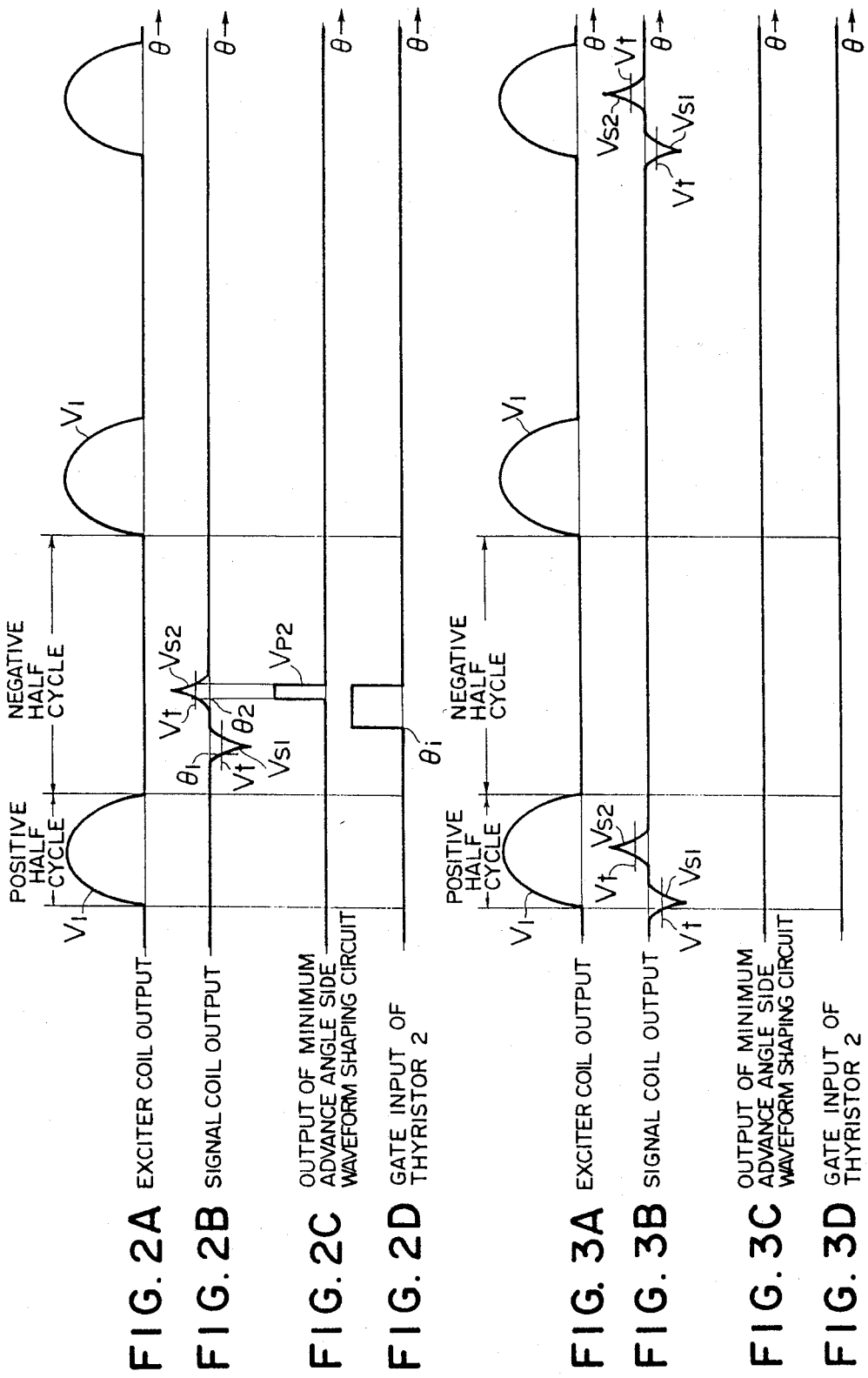

IGNITION SYSTEM FOR AN INTERNAL COMBUSTION ENGINE

BACKGROUND OF THE INVENTION

The present invention relates to an ignition system for an internal combustion engine in which an exciter coil provided in an electric generator rotating in synchronism with the engine is used as an ignition power source.

A two cycle engine has a potential danger in that unwanted ignition may take place during reverse or backward rotation of the engine crank shaft, with the result that the engine is driven backward by the ignition resulting in self-continuing backward rotation. Various measures have been proposed to prevent ignition during reverse rotation.

One type of known electronically-controlled ignition system comprises an ignition circuit including an exciter coil for producing a voltage of positive and negative half cycles in synchronism with rotation of the engine, a semiconductor switch which is turned on when an ignition signal is given and an ignition coil having a primay and a secondary windings, the positive hald cycles of the output of the exciter coil being used as the ignition energy and the conduction of the semiconductor switch causing an abrupt change in the primary current of the ignition coil to induce a high voltage for the ignition in the secondary winding of the ignition coil, a signal coil outputting a maximum advance angle side signal whose absolute value exceeds a threshold level at the maximum advance angle position of the engine and a minimum advance angle side signal whose absolute value exceeds a threshold level at the minimum advance angle position of the engine, a maximum advance angle side waveform shaping circuit for converting the maximum advance angle side signal into a maximum advance angle position indicating pulse whose duration corresponds to the period for which the maximum advance angle side signal is greater than the threshold level;

a minimum advance angle side waveform shaping circuit for converting the minimum advance angle side signal into a minimum advance angle position indicating pulse whose duration corresponds to the period for which the minimum advance angle side signal is greater than the threshold level, and an ignition timing control circuit responsive to the maximum advance angle position indicating pulse and the minimum advance angle position indicating pulse for producing the ignition signal used to turn on the semiconductor switch.

To impart backward drive prevention function to such an ignition system, it has been proposed in Japanese Utility Model Application No. 57817/1983, to arrange the exciter coil and the signal coil to have such a phase relationship that the minimum advance angle side signals are produced during the positive half cycles of the exciter coil when the engine is rotating forward and the minimum advance angle side signals are produced during the negative half cycles of the exciter coil when the engine is rotating backward, and to incorporate a bypassing switch circuit for bypassing the minimum advance angle position indicating pulse away from the ignition timing control circuit when the signal coil produces a minimum advance angle side signal during a negative half cycle of the exciter coil, thereby preventing firing action during backward rotation.

In the above-descrived ignition system, the output during the negative half cycles of the exciter coil (the output which does not contribute to the firing action) is short-circuited by a diode, or the output of the negative half cycles of the exciter coil is used to charge a capacitor in a power supply circuit. As a result, the current which flows during the negative half cycles of the exciter coil is larger than the current which flows during the positive half cycles of the exciter coil. By the effect of the armature reaction due to the current which flows during the negative half cycles of the exciter coil, the rise of the positive output of the exciter coil is retarded and hence the period of each positive half cycle becomes shorter. If, therefore, it is so arranged as in the above-descrived proposed system, that the minimum advance angle side signal is generated during the positive half cycles of the exciter coil, the width of a minimum advance angle side signal may become larger than the period of the corresponding positive half cycle of the exciter coil during a high speed rotation of the engine when the minimum advance angle side signal becomes large. In this state, the period of a negative half cycle of the exciter coil and the period of the minimum advance angle side signal may overlap with each other, preventing application of a part of the minimum advance angle position indicating pulse to the ignition timing control circuit. This may shift the ignition timing during the forward rotation, or cause failure of firing action, leading to failure of ignition.

SUMMARY OF THE INVENTION

An object of the invention is to provide an ignition system which prevents firing action during backward rotation of the engine without giving an adverse effect on the ignition during the forward rotation.

According to the invention, there is provided an ignition system for an internal combustion engine comprising:

an ignition circuit including an exciter coil for producing a voltage of positive and negative half cycles in synchronism with rotation of the engine, a semiconductor switch which is turned on when an ignition signal is given and an ignition coil having a primary and a secondary windings, the positive half cycles of the output of the exciter coil being used as the ignition energy and the conduction of the semiconductor switch causing an abrupt change in the primary current of the ignition coil to induce a high voltage for the ignition in the secondary winding of the ignition coil, a signal coil outputting a maximum advance angle side signal whose absolute value exceeds a threshold level at the maximum advance angle position of the engine and a minimum advance angle side signal whose absolute value exceeds a threshold level at the minimum advance angle position of the engine, a maximum advance angle side waveform shaping circuit for converting the maximum advance angle side signal into a maximum advance angle position indicating pulse whose duration corresponds to the period for which the maximum advance angle side signal is greater than the threshold level, a minimum advance angle side waveform shaping circuit for converting the minimum advance angle side signal into a minimum advance angle position indicating pulse whose duration corresponds to the period for which the minimum advance angle side signal is greater than the threshold level, an ignition timing control circuit responsive to the maximum advance angle position indicating pulse and the minimum advance angle position indicating pulse for producing the ignition signal, and a bypassing switch circuit connected to conduct when the minimum advance angle position indicating pulse is produced during the positive half cycle of the exciter coil to bypass the minimum advance angle position indicating pulse away from the ignition timing control circuit when the engine is rotating backward, wherein the exciter coil and the signal coil are arranged to have such a phase relation that the minimum advance angle side signals are produced during the negative half cycles of the exciter coil when the engine is rotating forward and the minimum advance angle side signals are produced during the positive half cycles of the exciter coil when the engine is rotating backward.

With the above-described arrangement, the minimum advance angle position indicating pulse is supplied to the ignition timing control circuit during the negative half cycles of the exciter coil when the engine is rotating forward, so that firing action is conducted. When the engine crank shaft is rotating backward, the bypassing switch circuit conducts if the minimum advance angle position indicating pulse is produced during the positive half cycles of the exciter coil, so that application of the minimum advance angle position indicating pulse to the ignition timing control circuit is prevented. Thus, no firing action is effected during backward rotation, so that no backward drive occurs, and hence no self-continuing backward rotation occurs.

The above-described arrangement has a limitation in that if the backward engine speed became high, the width of the minimum advance angle position indicating pulse would become larger than the width of the positive half cycle of the exciter coil, so that a part of the minimum advance angle position indicating pulse is applied to the ignition timing control circuit after the end of the positive half cycle of the exciter coil to result in firing action. However, in practive, the backward rotational speed of the engine will not become high, so that the above-described limitation is not problematical in practice.

BRIEF DESCRIPTION OF THE DRAWINGS

In the accompanying drawings:

FIG. 1 is a circuit diagram showing an embodiment of the invention; and

FIGS. 2A through 2D and 3A through 3D are time charts showing waveforms of the signals at various nodes of the circuit shown in FIG. 1.

DETAILED DESCRIPTION OF THE PREFERRED EMBODIMENTS

As shown in FIG. 1, an ignition system according to the invention comprises an exciter coil 1 producing voltages Ve1 and Ve2 of positive and negative half cycles in synchronism with the rotation of the engine, a semiconductor switch, such as a thyristor, 2 which is turned on when an ignition signal es is given to it and an ignition coil 3 having a primary and a secondary windings 3a and 3b. In the illustrated embodiment, one end of the primary winding 3a is grounded, and the other, non-grounded end of the primary winding 3a is connected to one electrode of a capacitor 4. The other electrode of the capacitor 4 is connected to the anode of the thyristor 2, whose cathode is grounded. A resistor 5 is connected across the gate and the cathode of the thyristor 2, whose anode is connected to the cathode of a diode 6. The anode of the diode 6 is connected to one end of the exciter coil 1. The other end of the exciter coil 1 is connected to the cathode of a diode 7, whose anode is grounded. A diode 8 is provided to form a part of the closed circuit for the negative output voltage Vs2 of the exciter coil 1, with its anode being directed toward the ground. The secondary winding 3b of the ignition coil 3 is connected to an ignition plug 9 mounted on a cylinder of the engine, not shown. The exciter coil 1, the thyristor (semiconductor switch) 2, the ignition coil 3, the capacitor 4, the resistor 5 and the diodes 6 through 8, in combination, form an ignition circuit 10 of a capacitor charge-discharge type. In operation, when the exciter coil 1 produces an output voltage Ve1 of the positive half cycle, the capacitor 4 is charged into a polarity as indicated in the figure, and thus "ignition energy" is stored. Upon conduction of the thyristor 2, the capacitor 4 is discharged through the primary winding 3a, thereby causing an abrupt change (increase) in the primary current of the ignition coil 3. The abrupt change in the primary winding 3a will induce, in the secondary winding 3b, a high voltage which is supplied to the ignition plug 9, where a spark occurs for igniting the engine.

A signal coil 11 produces a maximum advance angle side signal Vs1 whose absolute value (magnitude) exceeds a threshold level Vt at the maximum advance angle position, and a minimum advance angle side signal Vs2 whose absolute value exceeds a threshold level Vt at the minimum advance angle position. The signals Vs1 and Vs2 are inputted into a maximum advance angle waveform shaping circuit 12 and a minimum advance angle side waveform shaping circuit 13, where they are respectively converted into a maximum advance angle position indicating pulse Vp1 and a minimum advance angle position indicating pulse Vp2, whose durations correspond respectively to the periods for which the signals Vs1 and Vs2 are greater than the threshold level.

An ignition timing control circuit 14 has pulse signal input terminals P1 and P2 for receiving the pulses Vp1 and Vp2, a power supply input terminal E connected to the non-grounded output terminal of a power supply circuit 15, a ground terminal G which is grounded, and an ignition signal output terminal 5 connected to the gate of the thyristor 2.

The power supply circuit 15 comprises a diode 16 having its anode connected to the junction between the exciter coil 1 and the diode 7, a capacitor 17 connected across the cathode of the diode 16 and the ground, a thyristor 18 having its anode connected to the anode of the diode 16 and having its cathode grounded, a resistor 19 connected across the gate and the cathode of the thyristor 18, a series circuit of resistors 20 and 21 connected across the capacitor 17, and a Zener diode 22 connected across the junction between the resistors 20 and 21 and the gate of the thyristor 18. The non-grounded electrode of the capacitor 17 is connected to the power supply terminal E of the ignition timing control circuit 14. The capacitor 17 is charged into the polarity indicated in the figure by the negative output of the exciter coil 1. When the voltage across the capacitor 17 reaches a predetermined value, the Zener diode 22 conducts to supply a trigger signal to the thyristor 18, which therefore conducts to prevent further charging of the capacitor 17. The voltage across the capacitor 17 is therefore maintained at a constant value, and this constant voltage is supplied to the power supply terminal E of the ignition timing control circuit 14.

The ignition timing control circuit 14 is responsive to the pulses Vp1 and Vp2 for producing ignition signals es at an appropriate timing, which varies with the rotational speed of the engine. Such an ignition timing control circuit is known, and does not produce the ignition signal if both of the pulses are not supplied. The ignition signal es is supplied to the gate of the thyristor 2 of the ignition circuit 10.

According to the invention, there is further provided a bypassing switch circuit 25 which conducts when the minimum advance angle position indicating pulse is produced during the positive half cycles of the exciter coil 1 for bypassing the pulse Vp2 away from the ignition timing control circuit 14. The exciter coil 1 and the signal coil 11 are arranged to have such a phase relationship that the signal Vs2 is generated during the negative half cycles of the exciter coil 1 when the engine is rotating forward and the signal Vs2 is generated during the positive half cycles of the exciter coil 1 when the engine is rotating backward.

In the embodiment illustrated, the bypassing circuit 25 comprises an NPN transistor 26 whose collector is connected to the input terminal P2 of the ignition timing control circuit 14. The base of the transistor 26 is connected through a diode 27 to the non-grounded end of the exciter coil 1, with the diode 27 having its anode being directed toward the base of the transistor 26. The base of the transistor 26 is also connected through a resistor 28 to the non-grounded electrode of the capacitor 17. Thus, the base of the transistor 26 is pulled down to a low potential, making the transistor non-conductive, when the exciter coil 1 is producing a negative voltage Ve2. The transistor 26, the diode 27 and the resistor 28, in combination, form the pulse bypassing circuit 25.

When the exciter coil 1 is producing a negative output Ve2, the cathode of the diode 8 is lower than the ground potential by the forward voltage drop, e.g. 0.6 V, of the diode 8. As a result, the base of the transistor 26 is pulled down to a low voltage, e.g. 0 V, higher than the potential ($-0.6$ V) of the cathode of the diode 8 by the forward voltage drop of the diode 27, e.g. 0.6 V. When the exciter coil 1 is producing a positive output Ve1, such a pulling-down of the base potential does not occur, and the base current is increased by the voltage on the capacitor 17 so that the transistor 26 is conductive. For this reason, during the negative half cycles of the exciter coil 1 the transistor 26 is kept in the OFF state, so that it permits application of the output of the waveform shaping circuit 13 to the ignition timing control circuit 14. During the positive half cycles of the exciter coil 1, the transistor 26 is ready to conduct due to the base current from the power supply circuit and actually conducts when the pulse Vp2 is produced by the waveform shaping circuit 13, so that the transistor 26 prevents application of the pulse Vp2 to the ignition timing control circuit 14.

FIGS. 2A through 2D show the waveforms during the forward rotation of the engine at the nodes A through D in FIG. 1. As is seen, during the forward rotation, the maximum advance angle side signal Vs1 which exceeds the threshold level Vt at the maximum advance angle position $\theta 1$, and the minimum advance angle side signal Vs2 which exceeds the threshold level Vt at the minimum advance angle position $\theta 2$ are produced by the signal coil 11 during the negative half cycles of the exciter coil 1. The signals Vs1 and Vs2 are converted, by the waveform shaping circuits 12 and 13, into the pulses Vp1 (not illustrated) and Vp2 whose durations correspond, respectively, to the periods for which the absolute values of the signals Vs1 and Vs2 are greater than the threshold level Vt.

As was described above, when the exciter coil 1 is outputting the voltage Ve2 of the negative half cycles, the transistor 26 is non-conductive and permits aplication of the pulse Vp2 to the ignition timing control circuit 14. The ignition timing control circuit 14 therefore receives both of the pulses Vp1 and Vp2. The ignition timing control circuit 14 therefore supplies an ignition signal es to the thyristor 2 of the ignition circuit 10 at an appropriate position $\theta i$ between the maximum and the minimum advance angle positions $\theta 1$ and $\theta 2$. When the ignition signal is given, the thyristor 2 conducts, so that the charge on the capacitor 4 is discharged through the primary winding $3a$ of the ignition coil 3. Thus, firing action is conducted. In this way, firing action is effected during the forward rotation of the engine. The rotation of the engine is therefore maintained.

The operation which takes place when the engine crank shaft is rotating backward for some reason is shown in FIGS. 3A through 3D. During the backward rotation, the signals Vs1 and Vs2 are produced during the positive half cycles of the exciter coil 1. As a result, upon generation of the pulse Vp2, the transistor 26 conducts to bypass the pulse Vp2 to the ground, so that application of the pulse Vp2 to the ignition timing control circuit 14 is prevented. The ignition timing control circuit 14 does not produce the ignition signal es, so that no firing action takes place. Since no firing action is conducted during the backward rotation, no backward driving power is generated by the engine itself. In other words, self-continuing backward rotation does not occur.

In the embodiment described above, the ignition circuit 10 is of a capacitor charge-discharge type. But the invention is also applicable to a system incorporating a current interruption type ignition circuit.

As has been descrived, according to the invention, there is provided a bypassing switch circuit which conducts during positive half cycles (the half cycles which do not contribute to the firing action) of the exciter coil. Moreover, it is so arranged that the signal coil produces the minimum advance angle side signal during the negative half cycles of the exciter coil when the eingine is rotating forward and the signal coil produces the minimum advance angle side signal during the positive half cycles of the exciter coil when the engine is rotating backward. The minimum advance angle position indicating pulse can be applied to the ignition timing control circuit even if the width of the minimum advance angle position indicating pulse is greater than the width of the positive half cycle of the exciter coil during the forward rotation of the engine. During the backward rotation of the engine, application of the minimum advance angle position indicating pulse to the ignition timing control circuit can be prevented by the conduction of the bypassing switch circuit. Accordingly, firing action during backward rotation and hence backward drive can be prevented without giving any adverse effect on the firing action during forward rotation of the engine.

What is claimed is:

1. An ignition system for an internal combustion engine comprising:
   an ignition circuit including an exciter coil for producing a voltage of positive and negative half cycles in synchronism with rotation of the engine, a semiconductor switch which is turned on when an ignition signal is given and an ignition coil having a primary and a secondary windings, the positive half cycles of the output of the exciter coil being used as the ignition energy and the conduction of the semiconductor switch causing an abrupt change in the primary current of the ignition coil to induce a high voltage for the ignition in the secondary winding of the ignition coil,
   a signal coil outputting a maximum advance angle side signal whose absolute value exceeds a threshold level at the maximum advance angle position of the engine and a minimum advance angle side signal whose absolute value exceeds a threshold level at the minimum advance angle position of the engine,
   a maximum advance angle side waveform shaping circuit for converting the maximum advance angle side signal into a maximum advance angle position indicating pulse whose duration corresponds to the period for which the maximum advance angle side signal is greater than the threshold level,
   a minimum advance angle side waveform shaping circuit for converting the minimum advance angle side signal into a minimum advance angle position indicating pulse whose duration corresponds to the period for which the minimum advance angle side signal is greater than the threshold level,
   an ignition timing control circuit responsive to the maximum advance angle position indicating pulse and the minimum advance angle position indicating pulse for producing the ignition signal, and
   a bypassing switch circuit connected to conduct when the minimum advance angle position indicating pulse is produced during the positive half cycle of the exciter coil to bypass the minimum advance angle position indicating pulse away from the ignition timing control circuit when the engine is rotating backward,
   wherein the exciter coil and the signal coil are arranged to have such a phase relation that the minimum advance angle side signals are produced during the negative half cycles of the exciter coil when the engine is rotating forward and the minimum advance angle side signals are produced during the positive half cycles of the exciter coil when the engine is rotating backward.

2. A system according to claim 1, wherein the bypassing switch circuit comprises a transistor connected to bypass the minimum advance angle position indicating pulse to the ground during the positive half cycles of the exciter coil.

3. A system according to claim 2, wherein the ignition timing control circuit has an input terminal receiving the minimum advance angle position indicating pulse, and the transistor has its collector and emitter connected across said input terminal of the ignition timing control circuit and the ground, and has its base connected to receive a base current from a constant voltage power supply circuit and connected through a diode to the ungrounded end of the exciter coil to be pulled down to a low potential making the transistor non-conductive when the exciter coil is producing an output of the negative half cycle, whereby conduction of the transistor during the negative half cycles is prevented, while the transistor is ready to conduct during the positive half cycles.

4. A system according to claim 1, wherein the ignition timing control circuit is of such a type that does not produce the ignition signal unless it receive both the the maximum advance angle position indicating pulse and the minimum advance angle position indicating pulse.

5. A system according to claim 1, wherein the ignition circuit is of a capacitor charge-discharge type comprising a capacitor connected to be charged by the voltage of the positive half cycle of the exciter coil and discharged by the conduction of the semiconductor switch through the primary winding of the ignition coil to cause the abrupt change in the form of an abrupt increase in the primary current of the ignition coil.

6. A system according to claim 1, further comprising a power supply circuit comprising a capacitor connected to be charged by the output of the negative half cycles of the exciter coil, the output of the power supply circuit being supplied to the ignition timing control circuit.

7. A system according to claim 6, wherein the ignition timing control circuit has an input terminal receiving the minimum advance angle position indicating pulse, and the transistor has its collector and emitter connected across said input terminal of the ignition timing control circuit and the ground, and has its base connected to receive a base current from the power supply circuit and connected through a diode to the ungrounded end of the exciter coil to be pulled down to a low potential making the transistor non-conductive when the exciter coil is producing an output of the negative half cycle, whereby conduction of the transistor during the negative half cycles is prevented, while the transistor is ready to conduct during the positive half cycles.

* * * * *